Jan. 11, 1949.   J. DE SWART   2,458,897
ARTICLE SUPPORT
Filed July 13, 1946   2 Sheets-Sheet 1
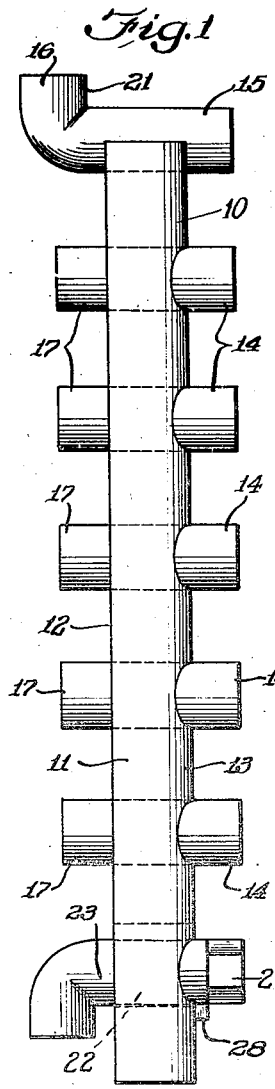
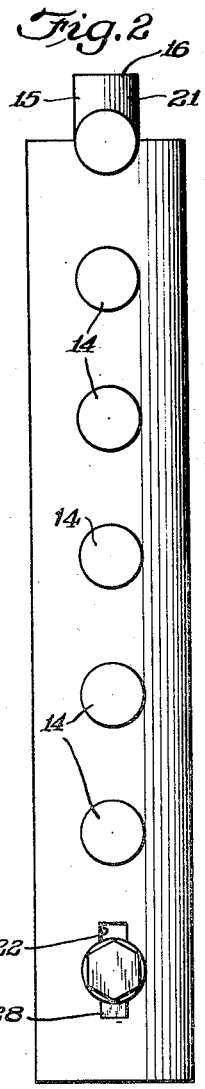
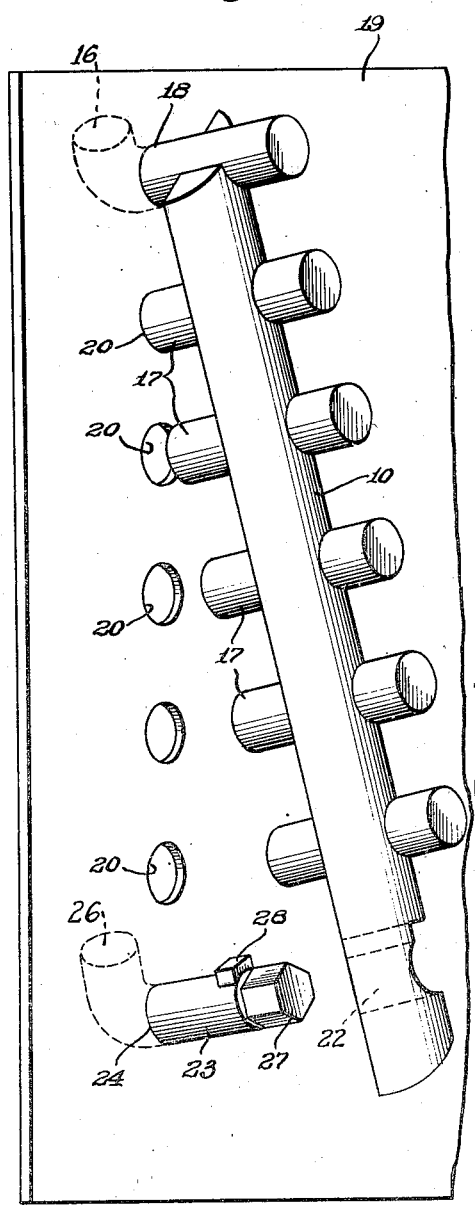
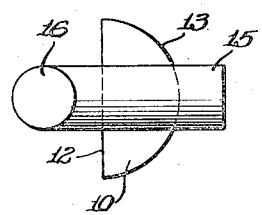
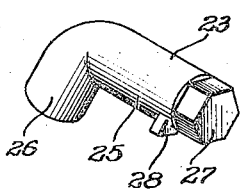
INVENTOR.
Jan de Swart
BY
Cromwell, Greist & Warden
Attys.

Jan. 11, 1949.  J. DE SWART  2,458,897
ARTICLE SUPPORT
Filed July 13, 1946  2 Sheets-Sheet 2
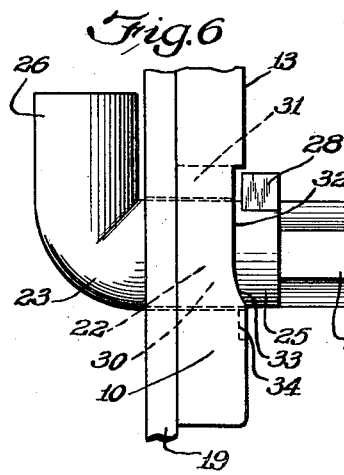
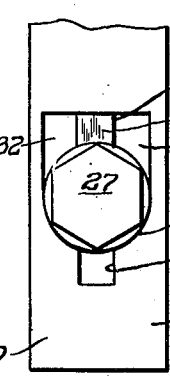
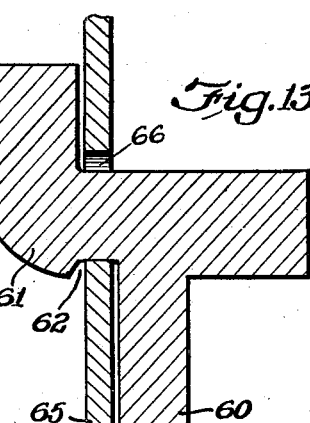
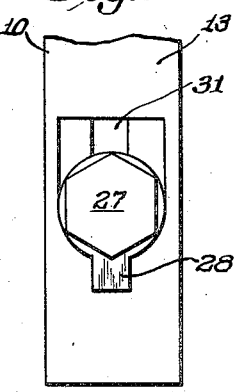
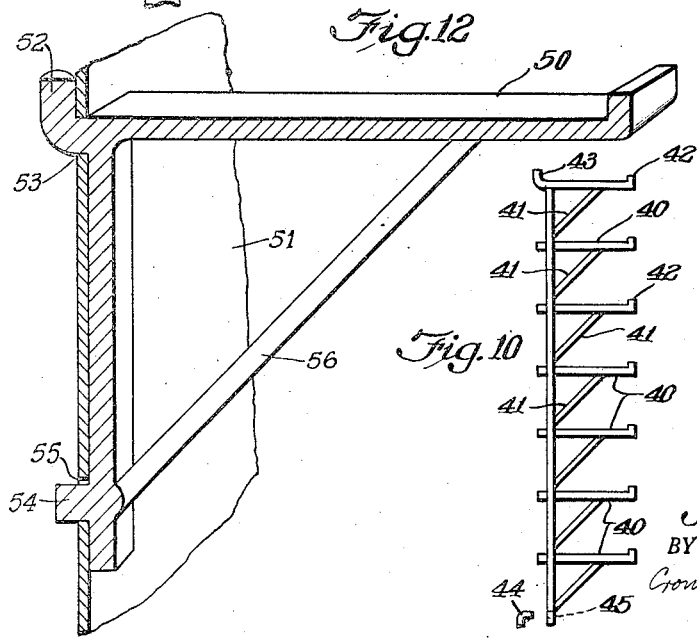
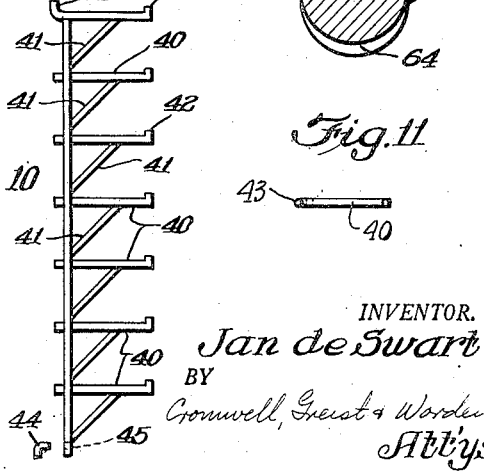
INVENTOR.
Jan de Swart
BY
Cromwell, Greist & Worden
Att'ys.

Patented Jan. 11, 1949

2,458,897

UNITED STATES PATENT OFFICE 2,458,897

ARTICLE SUPPORT

Jan de Swart, Los Angeles, Calif., assignor to Shellmar Products Corporation, Chicago, Ill., a corporation of Delaware Application July 13, 1946, Serial No. 683,373

5 Claims. (Cl. 248—243)

My invention is concerned with improvements in an article support or bracket which is particularly adapted for supporting a plurality of shelves or similar members from a generally vertical wall or similar surface.

In many modern wall constructions such as in the walls of refrigerators, cabinets and even houses, a very thin, hard material is used which is formed of sheet forming plastic compositions and other materials, such as thin wood veneer laminated with a hardenable plastic composition. This type of wall may be readily punched or drilled but it will usually chip or break if one attempts to drive a nail into it. Also it is usually so thin that nails or screws do not firmly anchor in it. In such constructions it is desirable to provide a means for supporting shelves or articles which may be readily attached to the wall without the use of nails or screws or similar fastening elements.

It is an object of my invention to provide a bracket or supporting member having means whereby the bracket may be removably but firmly secured in apertures provided in a relatively thin wall member.

It is a more specific object of my invention to provide a bracket device for supporting a plurality of articles, such as shelves, from a wall wherein the device is provided with hook-like attaching elements and a locking means adapted to be positioned in apertures provided in the wall surface.

It is a further object of my invention to provide a supporting bracket construction having a minimum number of parts which is particularly adapted to be molded of plastic material.

These and other objects will be apparent from the preferred form of my invention and the modifications thereof which are shown by way of illustration in the accompanying drawings, wherein:

Fig. 1 is a side elevation of the preferred form of my shelf supporting bracket;

Fig. 2 is a front elevation of the same;

Fig. 3 is a top plan of the same;

Fig. 4 is a perspective view of the locking key;

Fig. 5 is a view illustrating the method of mounting my bracket on a vertical wall;

Fig. 6 is a side view to a larger scale of the lower end of the bracket showing the locking key in its initial inserted position;

Fig. 7 is a front elevation of the structure shown in Fig. 6;

Fig. 8 is a side view similar to Fig. 6 showing the locking key in its final locking position;

Fig. 9 is a front elevation of the structure shown in Fig. 8;

Fig. 10 is a side elevation showing a modified form of my shelf support;

Fig. 11 is a top plan of the structure shown in Fig. 10;

Fig. 12 is a perspective view of a further modified form of my shelf support;

Fig. 13 is a sectional view showing a still further modified form of my shelf support; and Fig. 14 is a section on the line 14—14 of Fig. 13.

In the preferred form of my multiple shelf support 10 as illustrated in Figs. 1 to 9 inclusive, I have provided a relatively long semi-cylindrical body portion 11 with a flat face 12 which is adapted to be positioned against the wall surface on which the bracket is to be supported. The outer or front surface 13 which is rounded, as illustrated, may be any other desired contour. On the front face 13 I provide a plurality of outwardly extending members 14 which are adapted to receive in supporting relation a portion of a shelf or similar article. While the members 14 are illustrated as circular in cross section, they may be any desired configuration and they may also be provided with hooks, sockets, grooves or recessed portions, if desired, depending upon the specific structure of the article which it is desired to support on them.

At the top of my support 10 I provide a hook-like attaching member 15 which has a portion extending laterally in a direction opposite to that of the supporting members 14 and which includes an upwardly directed generally tubular or cylindrical extension 16. Laterally extending pins or members 17 are provided in spaced relation along the face 12. As shown in Fig. 5, the attaching hook 15 is adapted to be inserted in an aperture 18 in a supporting wall 19, while the pins 17 are adapted to be inserted in apertures 20 in the wall 19. The forward face or surface 21 of the extension 16 of the hook member 15 is adapted to engage the face of the wall member 19 which is opposite the face of the same which is engaged by surface 12. This prevents the withdrawal of the member 15 laterally or outwardly from the aperture 18 and thus retains the upper end of the support 10 in engagement with the wall 19. The engagement of members 17 in the apertures 20 prevents sidewise movement of the bracket 10 and helps to support the same by relieving some of the stress on the attaching hook 15.

At the bottom of the bracket 10 I have provided a keyhole slot 22 and a key member 23 for cooperation with an aperture 24 in the wall 19 to secure or latch the bracket 10 in engagement with the wall 19.

The key member 23 is hook-like in shape, having a main or barrel portion 25 and a laterally extending hook portion 26. The barrel portion 25 is provided with a hexagonally shaped head 27 and a laterally projecting locking member or knob 28.

The keyhole slot 22 (Figs. 6 to 9) is formed by a central bore 30 adapted to pass the barrel portion 25 of the key member 23 and an upwardly directed groove 31 adapted to pass the locking knob 28. The key member 23 is inserted in the slot 22 by passing the head 27 of the member 23 through the bore 30 and moving the knob 28 through the groove 31 (Figs. 5 and 6) until the key 23 is positioned as shown in Fig. 6. The forward face 13 of the bracket 10 is cut away to provide a flat portion at 32 extending laterally on both sides of groove 31. The flat portion 32 slopes outwardly at 33 near the bottom of the bore 30 and merges in a gradual slope and merges with the curved surface 13. A locking or latching recess 34 is provided in the surface 13 extending downwardly from the bore 30 in the bracket 10 for receiving the knob 28 to lock the key 23 in position. The recess 34 is of less depth than the cut away portion 32 so that when the key is turned from the initial position in Fig. 6 to the locked position in Fig. 8, the locking knob 28 first moves downwardly and outwardly on the sloping surface 33 and then snaps into the recess 34 with sufficient tightness to firmly hold the bracket 10 against the surface of the wall 19.

As indicated in Fig. 5, bracket 10 is attached to the wall 19 by positioning key 23 in the aperture 24, then inserting the portion 16 of hook 15 in the aperture 18 and pivoting bracket 10 to pass the head 27 of key 23 through the slot 22 in the bracket 10 after which the head 27 is rotated to bring the knob 28 of key 23 into the latching recess 34.

A modified form of my shelf support is shown in Figs. 10 and 11. In this construction the forwardly extending article supporting members of the preferred form are replaced by longer supporting members 40 which are each provided with an angular brace member 41. An upturned ledge 42 may be provided on the end of each member 40 to hold the shelf or other article in position on the member. The remaining features of construction are the same as in the preferred form (Figs. 1 to 9), an attaching hook 43 being provided at the top and a locking key 44 and cooperating slot 45 being provided at the bottom.

The construction illustrated in Fig. 12 is similar to that shown in Figs. 10 and 11 but only one supporting member 50 is provided and the bracket is attached to the wall 51 by the top hook 52 inserted in the aperture 53 and the pin 54 inserted in the aperture 55 at the lower end of the brace member 56. The locking key and slot are omitted. This is a simplified form of my device for use where the weight of the shelf or the article supported thereon is sufficient to hold the bracket in position on the wall.

In Fig. 13 I have illustrated a modified construction which may be used to give the support 60 a self-locking action. The attaching hook 61 is provided with an undercut groove 62 and the rearwardly extending pin members 63 are each provided with a similar groove 64. The grooves 62 and 64 are wide enough to accommodate the thickness of the supporting wall 65 so that when the support 60 is in position on the wall 65 with hook 61 engaged in aperture 66 and pins 63 engaged in apertures 67, portions of the wall are engaged in the grooves 62 and 64 and movement of the support 60 forwardly therefrom is prevented.

I claim:

1. A shelf support adapted to be attached to a supporting wall having vertically spaced apertures, comprising a body portion having a laterally extending attaching hook adjacent one end thereof and a keyhole slot adjacent the opposite end, and a hook-shaped key, said attaching hook being adapted to be positioned in one of the apertures in said supporting wall, and said key being adapted to be positioned in another of the apertures in said supporting wall and in said keyhole slot to attach said shelf support to said supporting wall.

2. A shelf support as claimed in claim 1 wherein said attaching hook is adjacent the top of said shelf support and said keyhole slot is adjacent the bottom of said shelf support and wherein cooperating means is provided on said key and said body portion adapted to be interengaged to latch said key in attaching position.

3. In a bracket adapted to be secured in spaced apertures in a supporting wall, an attaching member having a hook-like end extending upwardly of said bracket, said hook-like end being adapted to be inserted in one of said spaced apertures, a keyhole slot in said bracket, a key member having a laterally extending hook-like end portion adapted to be inserted in another of said spaced apertures, the other end of said key being insertable in said keyhole slot, and interlocking members on said key member and said bracket whereby said key may be latched in position when inserted in said aperture and said slot to secure said bracket to said supporting wall.

4. A support for a shelf or the like, comprising a body portion, laterally projecting means for supporting thereon a portion of a shelf, a pair of spaced hook-like members projecting laterally from said body portion for attaching said body portion to an apertured wall member, one of said hook-like members being rotatable relative to said body portion and interengaging locking means on said last mentioned member and said body portion.

5. In a bracket having laterally extending means for supporting an article, top and bottom hook-like attaching members adapted to be inserted in spaced apertures in a supporting wall and intermediate laterally projecting positioning elements adapted to be received in other apertures in said supporting wall.

JAN DE SWART.

REFERENCES CITED

The following references are of record in the file of this patent:

UNITED STATES PATENTS

| Number | Name | Date |
| --- | --- | --- |
| 941,682 | Knape | Nov. 30, 1909 |
| 1,343,327 | Levene | June 15, 1920 |
| 2,099,116 | Kalmbach | May 7, 1936 |
| 2,103,484 | Meyer | Dec. 28, 1937 |